(12) United States Patent
Viorel et al.

(10) Patent No.: US 10,212,573 B2
(45) Date of Patent: Feb. 19, 2019

(54) COVERAGE-DEFICIENT TERMINAL CONNECTION PROCEDURES

(71) Applicant: FUJITSU CONNECTED TECHNOLOGIES LIMITED, Kawasaki-shi, Kanagawa (JP)

(72) Inventors: Dorin G. Viorel, Calgary (CA); Akira Ito, San Jose, CA (US); Chenxi Zhu, Sunnyvale, CA (US)

(73) Assignee: FUJITSU CONNECTED TECHNOLOGIES LIMITED, Kawasaki (JP)

( * ) Notice: Subject to any disclaimer, the term of this patent is extended or adjusted under 35 U.S.C. 154(b) by 0 days.

(21) Appl. No.: 14/909,080

(22) PCT Filed: Feb. 10, 2014

(86) PCT No.: PCT/US2014/015633
§ 371 (c)(1),
(2) Date: Jan. 29, 2016

(87) PCT Pub. No.: WO2015/016970
PCT Pub. Date: Feb. 5, 2015

(65) Prior Publication Data
US 2016/0174083 A1    Jun. 16, 2016

Related U.S. Application Data

(60) Provisional application No. 61/861,402, filed on Aug. 1, 2013.

(51) Int. Cl.
*H04W 8/00* (2009.01)
*H04W 76/14* (2018.01)
(Continued)

(52) U.S. Cl.
CPC .......... *H04W 8/005* (2013.01); *H04B 7/0456* (2013.01); *H04B 7/0617* (2013.01);
(Continued)

(58) Field of Classification Search
None
See application file for complete search history.

(56) References Cited

U.S. PATENT DOCUMENTS 5,850,592 A   12/1998   Ramanathan
6,493,759 B1  12/2002   Passman et al.
(Continued)

OTHER PUBLICATIONS

U.S. Office Action issued in corresponding U.S. Appl. No. 14/909,082, dated Apr. 28, 2017.
(Continued)

*Primary Examiner* — Robert C Scheibel
(74) *Attorney, Agent, or Firm* — Maschoff Brennan (57) ABSTRACT

A method may include detecting a synchronization signal from a base station. The method may further include determining a synchronization detection probability based on the detection of the synchronization signal. The method may further include estimating a coverage deficit range based on the synchronization detection probability. The method may further include transmitting coverage deficit signaling configured to indicate the coverage deficit range estimated based on the synchronization detection probability.

19 Claims, 6 Drawing Sheets

(51) Int. Cl.
| | |
|---|---|
| *H04W 4/70* | (2018.01) |
| *H04B 7/0456* | (2017.01) |
| *H04B 7/06* | (2006.01) |
| *H04W 24/02* | (2009.01) |
| *H04W 74/00* | (2009.01) |
| *H04W 52/24* | (2009.01) |
| *H04W 72/04* | (2009.01) |
| *H04W 8/18* | (2009.01) |
| *H04W 56/00* | (2009.01) |
| *H04W 72/10* | (2009.01) |
| *H04W 28/04* | (2009.01) |

(52) U.S. Cl.
CPC ............ *H04B 7/0639* (2013.01); *H04W 4/70* (2018.02); *H04W 8/186* (2013.01); *H04W 24/02* (2013.01); *H04W 28/04* (2013.01); *H04W 52/241* (2013.01); *H04W 52/242* (2013.01); *H04W 52/243* (2013.01); *H04W 56/001* (2013.01); *H04W 72/042* (2013.01); *H04W 72/0406* (2013.01); *H04W 72/0413* (2013.01); *H04W 72/0446* (2013.01); *H04W 72/0473* (2013.01); *H04W 72/10* (2013.01); *H04W 74/006* (2013.01); *H04W 76/14* (2018.02)

(56) References Cited

U.S. PATENT DOCUMENTS

| | | | |
|---|---|---|---|
| 6,560,303 | B1 | 5/2003 | Fan et al. |
| 6,711,409 | B1 | 3/2004 | Zavgren, Jr. et al. |
| 7,978,631 | B1 | 7/2011 | Abdelaziz et al. |
| 8,355,736 | B2 | 1/2013 | Mitra et al. |
| 2004/0018842 | A1 | 1/2004 | Yu |
| 2006/0045130 | A1 | 3/2006 | Kim et al. |
| 2007/0010270 | A1 | 1/2007 | Dillon |
| 2007/0165569 | A1 | 7/2007 | Kaminski |
| 2007/0254643 | A1 | 11/2007 | Garcia et al. |
| 2008/0253327 | A1 | 10/2008 | Kohvakka et al. |
| 2009/0034432 | A1 | 2/2009 | Bonta et al. |
| 2010/0075689 | A1 | 3/2010 | Uemura et al. |
| 2010/0093364 | A1 | 4/2010 | Ribeiro |
| 2010/0148940 | A1 | 6/2010 | Gelvin et al. |
| 2010/0291962 | A1 | 11/2010 | Kim et al. |
| 2010/0303034 | A1 | 12/2010 | Chen et al. |
| 2011/0032909 | A1 | 2/2011 | Park et al. |
| 2011/0151887 | A1 | 6/2011 | Hakola |
| 2011/0319097 | A1 | 12/2011 | Wirola |
| 2012/0021704 | A1* | 1/2012 | Chan ................ H03G 3/3042 455/95 |
| 2012/0129540 | A1 | 5/2012 | Hakola et al. |
| 2012/0236909 | A1 | 9/2012 | Ma et al. |
| 2013/0138792 | A1 | 5/2013 | Preden et al. |
| 2013/0308714 | A1 | 11/2013 | Xu et al. |
| 2013/0308715 | A1 | 11/2013 | Nam et al. |
| 2014/0098759 | A1 | 4/2014 | Noh et al. |
| 2014/0098761 | A1* | 4/2014 | Lee ................ H04W 74/006 370/329 |
| 2014/0177683 | A1 | 6/2014 | Krishnamurthy et al. |
| 2014/0328329 | A1 | 11/2014 | Novlan et al. |
| 2014/0376458 | A1 | 12/2014 | Ryu et al. |
| 2015/0016312 | A1* | 1/2015 | Li ................ H04W 74/0833 370/280 |
| 2015/0173105 | A1* | 6/2015 | Bergstrom .......... H04W 74/006 370/329 |
| 2015/0223279 | A1 | 8/2015 | Jiao et al. |
| 2015/0257173 | A1* | 9/2015 | You ................ H04L 1/1864 370/330 |
| 2015/0296518 | A1* | 10/2015 | Yi ................ H04L 1/08 370/336 |
| 2015/0359004 | A1* | 12/2015 | Xu ................ H04W 74/0833 370/329 |
| 2016/0142981 | A1* | 5/2016 | Yi ................ H04J 11/0069 455/522 |
| 2016/0150570 | A1* | 5/2016 | Wang ................ H04W 4/005 370/329 |

OTHER PUBLICATIONS

U.S. Office Action issued in corresponding U.S. Appl. No. 14/909,082, dated Nov. 10, 2016.
U.S. Office Action issued in U.S. Appl. No. 14/908,858, dated Sep. 15, 2017.
U.S. Office Action issued in U.S. Appl. No. 14/908,974, dated Sep. 6, 2017.
U.S. Office Action issued in U.S. Appl. No. 14/909,082, dated Sep. 15, 2017.
U.S. Office Action issued in corresponding U.S. Appl. No. 14/909,077, dated May 22, 2017.
Advisory Action issued in related U.S. Appl. No. 14/909,082, dated Aug. 10, 2017.
U.S. Office Action issued in related U.S. Appl. No. 14/908,980, dated Aug. 11, 2017.
US Office Action dated Jan. 23, 2018 in U.S. Appl. No. 14/908,974.
Advisory Action dated Apr. 26, 2018 in U.S. Appl. No. 14/908,974.

* cited by examiner

COVERAGE-DEFICIENT TERMINAL CONNECTION PROCEDURES

FIELD

The embodiments discussed herein are related to connection procedures for coverage-deficient terminals.

BACKGROUND

Radio access communication networks such as Long Term Evolution (LTE) and Long Term Evolution Advanced (LTE-A) networks may be used for machine-to-machine (M2M) communications, also known as machine type communications (MTC). Generally, MTC may allow an unmanned terminal to wirelessly and remotely report information over the radio access network to a central dedicated server, which may distribute the information to suitable MTC applications upon request. Terminals with MTC capability may be used in a variety of situations. An example of such a situation may include smart meters that report resource consumption, measurements, or special events to a utility company server via the radio access communication network. Other examples of applications that may utilize MTC include security networks for use in surveillance, alarm systems or people tracking systems, transportation networks, fleet management, connected cars, city automation, toll collection, emission control, electronic health (eHealth) applications, manufacturing monitoring and automation, and facility management, including facility management of homes, buildings, etc.

The subject matter claimed herein is not limited to embodiments that solve any disadvantages or that operate only in environments such as those described above. Rather, this background is only provided to illustrate one example technology area where some embodiments described herein may be practiced.

SUMMARY

According to an aspect of an embodiment, a method may include detecting a synchronization signal from a base station. The method may further include determining a synchronization detection probability based on the detection of the synchronization signal. The method may further include estimating a coverage deficit range based on the synchronization detection probability. The method may further include transmitting coverage deficit signaling configured to indicate the coverage deficit range estimated based on the synchronization detection probability.

The object and advantages of the embodiments will be realized and achieved at least by the elements, features, and combinations particularly pointed out in the claims.

It is to be understood that both the foregoing general description and the following detailed description are exemplary and explanatory and are not restrictive of the invention, as claimed.

BRIEF DESCRIPTION OF THE DRAWINGS

Example embodiments will be described and explained with additional specificity and detail through the use of the accompanying drawings in which.

DESCRIPTION OF EMBODIMENTS

Some embodiments described herein may relate to a telecommunication system based on the 3rd Generation Partnership Project's (3GPP) Long Term Evolution (LTE) radio access network. Descriptions involving LTE may also apply to 3GPP's Long Term Evolution Advanced (LTE-A) radio access network. However, the embodiments described herein are not limited to the example telecommunication systems described. Rather, the embodiments described herein may also be applicable to other telecommunication systems.

Embodiments of the present invention will be explained with reference to the accompanying drawings.

Figure 1:
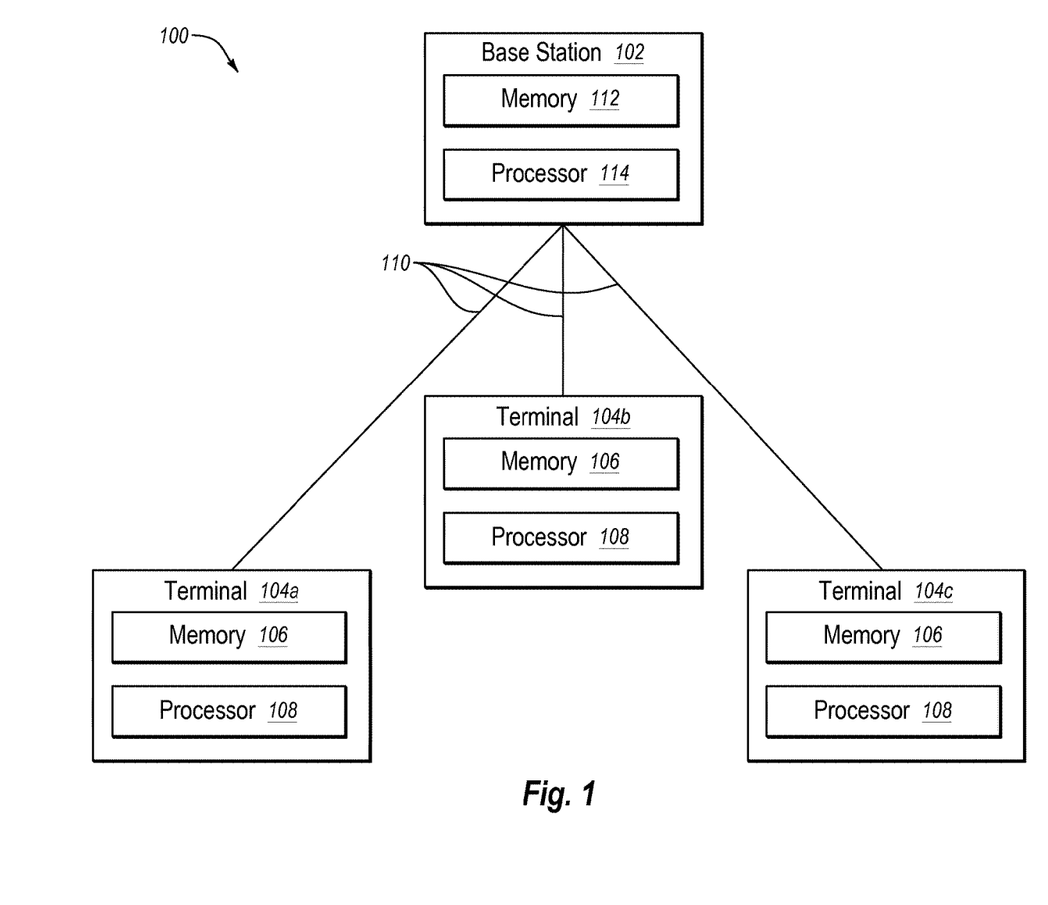
FIG. 1 is a diagram of an example telecommunication system.

FIG. 1 is a diagram of an example radio access system 100, arranged in accordance with at least one embodiment described herein. In some embodiments, a radio access network architecture of the radio access system 100 may include the radio access network architecture of an Evolved Universal Mobile Telecommunications System (E-UMTS). The E-UMTS may include an LTE radio access network, for instance. The radio access network may include an E-UMTS Terrestrial Radio Access Network (E-UTRAN). However, other types of network architecture may alternately or additionally be used.

The radio access system 100 may include a base station 102. The base station 102 may include base station equipment, including hardware and/or software for radio communication with radio-communication-equipped nodes ("wireless nodes") which may be described herein as devices. For example, the base station 102 may be equipped for communication over an air interface 110 with devices such as terminal 104a, terminal 104b, and terminal 104c (collectively "terminals 104"). The base station 102 may generally allow the wireless nodes, including the terminals 104, to wirelessly communicate with a core network (not shown) via the air interface 110 with the base station 102.

The base station 102 may include hardware and/or software for radio communication over a licensed spectrum. The licensed spectrum may generally include portions of a radio spectrum licensed for transmission of wireless data, such as cellular data. For example, the base station 102 may be configured to transmit cellular data that complies with an LTE radio access network, such as an LTE radio access network according to 3GPP LTE specification releases 8-12. The base station 102 may include an E-UTRAN NodeB (eNB) associated with LTE radio access networks. The base station 102 may include memory 112, a processor 114, and one or more radio frequency (RF) transceivers (not shown). The memory 112 may include a non-transitory computer-readable medium. Instructions, such as programming code executable by the processor 114, may be encoded in the memory 112. When the instructions are executed by the processor 116, the base station 102 may perform operations related to and/or including the processes described herein.

In some embodiments, the base station 102 may include a real-time, high-speed processor system (not shown) dedicated to one or more of the processes described herein. The real-time, high-speed processor system may include one or more dedicated processors including the processor 114. The real-time, high-speed processor system may work in a synchronized manner with the rest of the base station 102.

The terminals 104 may include equipment configured to allow the terminals 104 to transmit and receive data via wireless communications via the licensed spectrum. For example, the terminals 104 may include hardware, such as one or more antennas backed by related RF transceivers, for transmitting and receiving radio transmissions, and codecs. The terminals 104 may employ machine-type communication (MTC) hardware and/or software configured for communication with an MTC server (not shown) in communication with the core network. Examples of such terminals 104 may include, but are not limited to, surveillance and alarm devices, utility measuring and metering devices, manufacturing monitoring and automation devices, facility management devices, and the like. Alternately or additionally, the terminals 104 may include, but are not limited to, mobile phones, tablet computers, laptop computers, and/or other electronic devices that may use radio communication.

Each of the terminals 104 may include a memory 106 and a processor 108. The memory 106 may include a non-transitory computer-readable medium. Instructions such as programming code executable by the processor 108 may be encoded in the memory 106. When the instructions are executed by the processor 108, the associated terminals 104a, 104b, and 104c may perform operations related to and/or including the processes described herein.

Connection setup procedures between the terminals 104 and the base station 102 may be completed before the terminals 104 may transmit data to the base station 102 via the air interface 110. Connection setup procedures may include synchronizing the terminals 104 to the base station 102 as well as performing random-access procedures with the base station 102. In some embodiments, the random access procedures between the terminals 104 and the base station 102 may include messages generally corresponding to the messages exchanged during a random access procedure associated with LTE radio access networks.

The base station 102 may be associated with a cell within which the terminals 104 are located. In some instances, the terminals 104 within the cell associated with the base station 102 may experience a coverage deficit. The terminals 104 experiencing a coverage deficit may be located within the geographic area of the cell associated with the base station 102, but may experience a signal quality below a cell edge associated with a lowest reception power level provided to human users. For example, the terminals 104 experiencing coverage deficits may experience a signal-to-interference-and-noise ratio (SINR) below a cell edge SINR. By way of example, the terminals 104 experiencing coverage deficits may be located in coverage-challenged environments such as basements, equipment rooms, or the like.

Downlink (DL) and/or uplink (UL) physical channel repetition-based patterns may be employed to permit the terminals 104 experiencing coverage deficits to use the air interface 110 despite the coverage deficits. However, in some instances, the use of patterns based primarily on repetition may be a relatively inefficient use of spectrum resources. By way of example, the terminal 104a may experience a −15 decibel (dB) coverage deficit, i.e., the SINR experienced by the terminal 104a may be 15 dB below the cell edge SINR. The terminal 104a, employing repetition-based patterns for random access procedures, may use the same set of physical random access channel (PRACH) signatures consecutively for 32 PRACH time-division duplex (TDD) subframes and for each random-access-procedure-related message associated with LTE radio access networks or for 26 times for FDD LTE radio access networks, under certain channel propagation conditions. Accordingly, the PRACH collision risk for the PRACH TDD subframes and the random-access-procedure-related messages may be increased by 3200 percent over conventional random-access procedures for coverage-deficient terminals 104 for the related PRACH signatures.

In some embodiments set forth herein, use of repetition-based patterns may be optimized to improve spectrum efficiency for human traffic and MTC traffic via the air interface 110.

In some embodiments, each of the terminals 104 may estimate the coverage deficit. In some instances, the terminals 104 may estimate the coverage deficit by analyzing synchronization signals received from the base station 102. For example, the terminals 104 may estimate the coverage deficit by measuring a synchronization detection probability across a detection window as set forth herein.

Alternately or additionally, the terminals 104 may estimate a coverage deficit range. In some instances, the radio access system 100 may include multiple predefined coverage deficit ranges known to the base station 102 and the terminals 104. By way of example, the terminals 104 may estimate the coverage deficit by measuring the synchronization detection probability across the detection window and looking up a predefined coverage deficit range associated with the synchronization detection probability in a lookup table. The coverage deficit range may be expressed in SINR. The related SINR lookup table may be included in the memory 106 of the terminals 104. Alternately or additionally, the terminals 104 may determine the coverage deficit in some other manner and may correlate the coverage deficit to a SINR coverage deficit range via a lookup table.

The terminals 104 may communicate the estimated coverage deficit and/or the estimated coverage deficit range to the base station 102.

Figure 2:
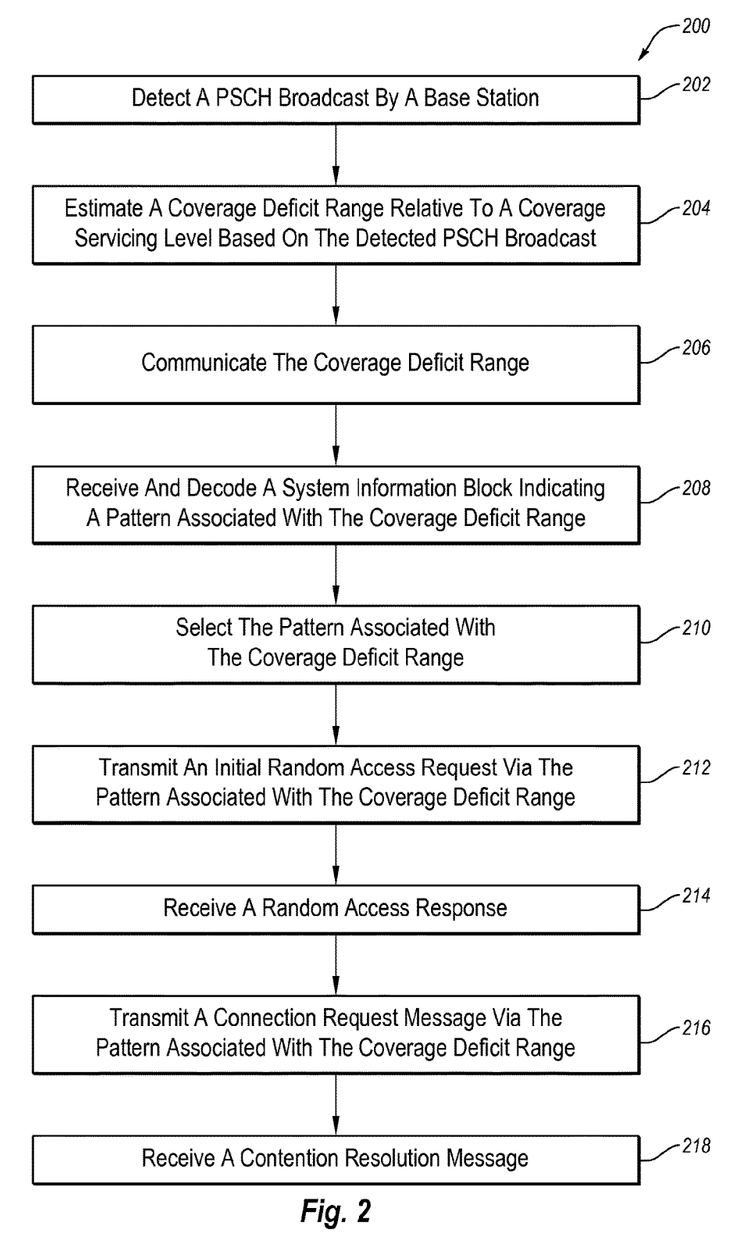
FIG. 2 is a flowchart of an example method of performing a random access procedure that may be performed in the telecommunication system of FIG. 1.

FIG. 2 is a flowchart of an example method 200 of performing a connection procedure. With combined reference to FIGS. 1 and 2, the method 200 may be performed in the radio access system 100. In some embodiments, the method 200 may be performed by one or more of the terminals 104 that may experience a coverage deficit. Alternately or additionally, the terminals 104 may be configured to transmit MTC traffic via the air interface 110. In some embodiments, the terminals 104 may begin the method 200 immediately following a power-on boot-up procedure.

The method 200 may begin at block 202 by detecting a primary synchronization channel (PSCH) broadcast by the base station 102. In some embodiments, a physical broadcast channel (PBCH) broadcast by the base station 102 may also be detected. In some instances, a System Frame Number (SFN) derived from the PBCH may be used to synchronize signaling performed as part of the method 200.

The method 200 may continue at block 204 by estimating a coverage deficit range based on the detected PSCH broadcast. In some embodiments, the coverage deficit range may be estimated relative to a coverage servicing level and may be expressed as SINR referenced to the cell edge SINR. By way of example, the coverage deficit range may be associated with ranges of SINRs relative to a cell edge SINR.

In some embodiments, a coverage deficit may be estimated by determining a synchronization detection probability. The synchronization detection probability may be based on primary synchronization signal (PSS) and/or secondary synchronization signal (SSS) acquisition times, for a given detection time window for a given type of terminal 104. The synchronization detection probability may correlate to the SINR experienced by the terminals 104 according to a correlation relationship described in more detail herein. In some instances, the correlation of the measured synchronization detection probability to the coverage-related SINR may depend at least in part on a local oscillator (LO) circuitry quality of the terminals 104.

When processing the synchronization detection probability based on the PSCH broadcast transmitted by the BS, the synchronization detection probability experienced by the terminals 104 may correlate to the coverage deficit of the terminals 104. In some embodiments, the terminals 104 may have a predetermined LO performance and may estimate the coverage deficits by measuring a synchronization detection probability across a PSCH detection window. In some embodiments, coverage deficits may be correlated to synchronization detection probabilities and/or coverage deficits in lookup tables stored in a non-volatile portion of the memory 106 of the terminals 104. The lookup tables may be pre-calibrated for each of the terminals 104. Accordingly, the terminals 104 may estimate the coverage deficit range relative to a coverage servicing level based on the detected PSCH.

The method 200 may continue at block 206 by communicating the coverage deficit range. In some embodiments, the method 200 may alternately return to block 202 if a device performing the method 200 is already connected, or if an initial random access request or a connection request of a random access procedure is in progress.

In some embodiments, communicating the coverage deficit range may include transmitting coverage deficit signaling to the base station 102 via a PRACH-based procedure customized for MTC devices. The coverage deficit signaling may alternately or additionally be transmitted via a main PRACH associated with LTE radio access networks.

In these and other embodiments, the MTC PRACH may be defined and used for performing random access procedures by the terminals 104. Alternately or additionally, the base station 102 may dedicate MTC PRACH resources for the terminals 104 operating in a coverage deficit location to perform connection procedures such as random access. The base station 102 may dedicate the MTC PRACH resources for the terminals 104 operating in the coverage deficit locations in order to initially allocate resources for performing connection procedures based on the coverage deficit ranges indicated via the coverage deficit signaling.

In some embodiments, the MTC PRACH may include a range of six physical resource blocks (PRBs), which may be defined additionally to the PRACH resources employed by human users, as defined in 3GPP LTE specification release 8. In some embodiments the physical allocation of the six PRBs may be non-contiguous. In some instances, the MTC PRACH may be used by the terminals 104 configured to transmit MTC data and experiencing coverage deficits.

In some instances, resources of the MTC PRACH may be used by the terminals 104 to perform coverage deficit signaling configured to indicate the coverage deficit range experienced by the terminals 104.

In some embodiments, the MTC PRACH may be referred to as a primary MTC PRACH. A secondary MTC PRACH may be allocated in response to coverage deficit traffic being detected on the main PRACH resource. In some embodiments, the MTC PRACH resource may be defined across six PRBs. In some embodiments the physical allocation of these six PRBs may be non-contiguous. Alternately or additionally, the secondary MTC PRACH resource may employ a subset of PRACH signatures across the 3GPP LTE specification release eight PRACH (referred to herein as "legacy PRACH") resources that is smaller than the overall set of the legacy PRACH signatures. The PRACH signatures dedicated for MTC may use the same time and frequency domain allocation as legacy (human) users, and may be differentiated by the related Zaddoff-Chu (ZC) sequence number, referred to herein as code domain multiplexing (CDM). Whether the secondary MTC PRACH is allocated may be based at least in part on the traffic conditions of the primary MTC PRACH. Both the secondary MTC PRACH and the primary MTC PRACH may accommodate traffic from the terminals 104 experiencing coverage deficits. In some instances, allocating a secondary MTC PRACH for use by the terminals 104 experiencing coverage deficits may optimize the amount of latency experienced by the terminals 104 using the primary MTC PRACH only. Some embodiments, using a reduced amount of machine users, may employ a primary MTC PRACH allocation as a part of the main system PRACH allocation (for example, the MTC PRACH allocation may include a subset of the total amount of ZC signatures employed by the six main PRACH PRB resources).

In some embodiments, coverage deficit ranges may be predefined for the radio access system 100. By way of example, the coverage deficit ranges may include five predefined coverage deficit ranges, each range covering 3 decibels (dB). Alternately or additionally, other ranges of coverage deficits may be defined. In some embodiments, the coverage deficit ranges may cover configurable ranges. For instance, some embodiments may use three coverage deficit ranges.

A first coverage deficit range may cover a coverage deficit range of less than 0 dB and more than or equal to −3 dB. A second coverage deficit range may cover a coverage deficit range of less than −3 dB and more than or equal to −6 dB. A third coverage deficit range may cover a coverage deficit range of less than −6 dB and more than or equal to −9 dB. A fourth coverage deficit range may cover a coverage deficit range of less than −9 dB and more than or equal to −12 dB. A fifth coverage deficit range may cover a coverage deficit range of less than −12 dB and more than or equal to −15 dB. Alternately, more or fewer predefined coverage deficit ranges may be used. For example, a sixth coverage deficit range may cover a coverage deficit range of less than −15 dB and more than or equal to −18 dB.

By way of further example, three coverage deficit ranges, each covering a coverage deficit range of 5 dB steps may be used. Some embodiments may use a first coverage deficit range between 0 down to −6 dB, a second one lower than −6 dB down to −12 dB and a lower than −12 dB range.

In some instances, the coverage deficit signaling may be transmitted with a coverage deficit range signaling pattern associated with the coverage deficit range. In some embodiments, the pattern may include a repetition pattern associated with the coverage deficit range. The repetition pattern may be relatively longer for a relatively larger coverage deficit of the coverage deficit ranges.

Alternately or additionally, the coverage deficit range signaling pattern may include a code-domain multiplexing pattern associated with the coverage deficit range, a time-domain multiplexing pattern associated with the coverage deficit range, a frequency-domain multiplexing pattern associated with the coverage deficit range, or the like or any combination thereof.

The coverage deficit range signaling patterns and the associated coverage deficit ranges may generally be known to the base station 102 and/or the terminals 104.

In some embodiments, multiple coverage deficit range signaling patterns may be used to signal a given coverage deficit range. If multiple coverage deficit range signaling patterns are available, the terminals 104 may select a coverage deficit range signaling pattern based on the estimated coverage deficit range.

In some embodiments, the coverage deficit signaling may include a power boost if the terminal may have any non-zero UL power headroom available. For example, one or more of the terminals 104 transmitting the coverage deficit signaling may boost the coverage deficit signal by +3 dB, +6 dB, or by some other amount if enough transmission power headroom is available. In some embodiments, coverage deficit range signaling patterns may be associated with coverage deficit ranges and with power boost values. For example, different coverage deficit range signaling patterns may be associated with coverage deficit ranges based on whether coverage deficit signaling includes no power boost, a +3 dB power boost, a +6 dB power boost, or another power boost.

In some embodiments, the base station 102 may receive the coverage deficit signaling according to the associated coverage deficit range signaling patterns and may estimate a number of the terminals 104 in the cell associated with each coverage deficit range.

Optionally, the method 200 may continue at block 208 by receiving a system information block (SIB) indicating a random access pattern associated with the coverage deficit range. Similar to the coverage deficit range signaling pattern, the random access pattern may include one or more of a repetition pattern, a code-domain multiplexing pattern associated with the coverage deficit range, a time-domain multiplexing pattern associated with the coverage deficit range, a frequency-domain multiplexing pattern associated with the coverage deficit range, or the like or any combination thereof.

In some embodiments, random access patterns may be associated with coverage deficit ranges and in some cases with power boost values. For example, different random access patterns may be associated with coverage deficit ranges based on whether random access sequences include no power boost, a +3 dB power boost, or another power boost value.

Optionally, the SIB may indicate multiple random access procedure repetition patterns associated with multiple coverage deficit ranges and the method 200 may continue at block 210 by selecting the random access procedure repetition pattern associated with the estimated coverage deficit range. The random access pattern may be different from the coverage deficit range signaling pattern.

In some embodiments, the random access patterns and the associated coverage deficit ranges and/or power boost values may generally be known to the base station 102 and/or the terminals 104.

The method 200 may continue by performing a coverage deficit random access procedure. For example, the method 200 may continue at block 212 by transmitting an initial random access request based on the random access pattern associated with the coverage deficit range. The method 200 may continue at block 214 by receiving a random access response from the base station 102. The random access response may identify resources for transmission of a connection request message to the base station 102. The method 200 may continue at block 216 by transmitting a connection request message via the random access pattern associated with the coverage deficit range, employing a specific PUSCH allocation.

In some embodiments, resources for the initial random access request and/or the connection request message via the random access pattern may be dedicated by the base station 102 in response to successfully receiving the coverage deficit signaling according to the coverage deficit range signaling pattern. The random access pattern may be associated with a coverage deficit range correlated to the coverage deficit signaling. Alternately or additionally, the base station 102 may dedicate resources for repetition-based MTC data communication in a physical downlink shared channel (PDSCH) and/or a physical uplink shared channel (PUSCH).

The method 200 may continue at block 218 by receiving a contention resolution message from the base station 102. The contention resolution message may indicate that the coverage deficit random access procedure was successful.

In some embodiments, the terminals 104 that attempt, but fail, the coverage deficit random access procedures may re-estimate the coverage deficit range to be within the next higher coverage deficit range (in absolute value) without departing from available coverage deficit ranges. The terminals 104 may then repeat the coverage deficit signaling with the updated coverage deficit range and may re-attempt the coverage deficit random access procedure via a random access pattern associated with the updated coverage deficit range.

For example, if the contention resolution message is not received during a certain time interval, a device performing the method may return from block 216 to block 206 and may consider the initial coverage deficit estimate as being too optimistic and indicates to block 206 the next higher coverage deficit range (in absolute value) without departing from available coverage deficit ranges. For instance, if a device performing the method 200 estimates an initial coverage deficit range of −3 dB to −6 dB and does not receive a contention resolution message within the certain time interval, the device may return to block 206 to communicate the coverage deficit range of −6 dB to −9 dB.

Figure 3:
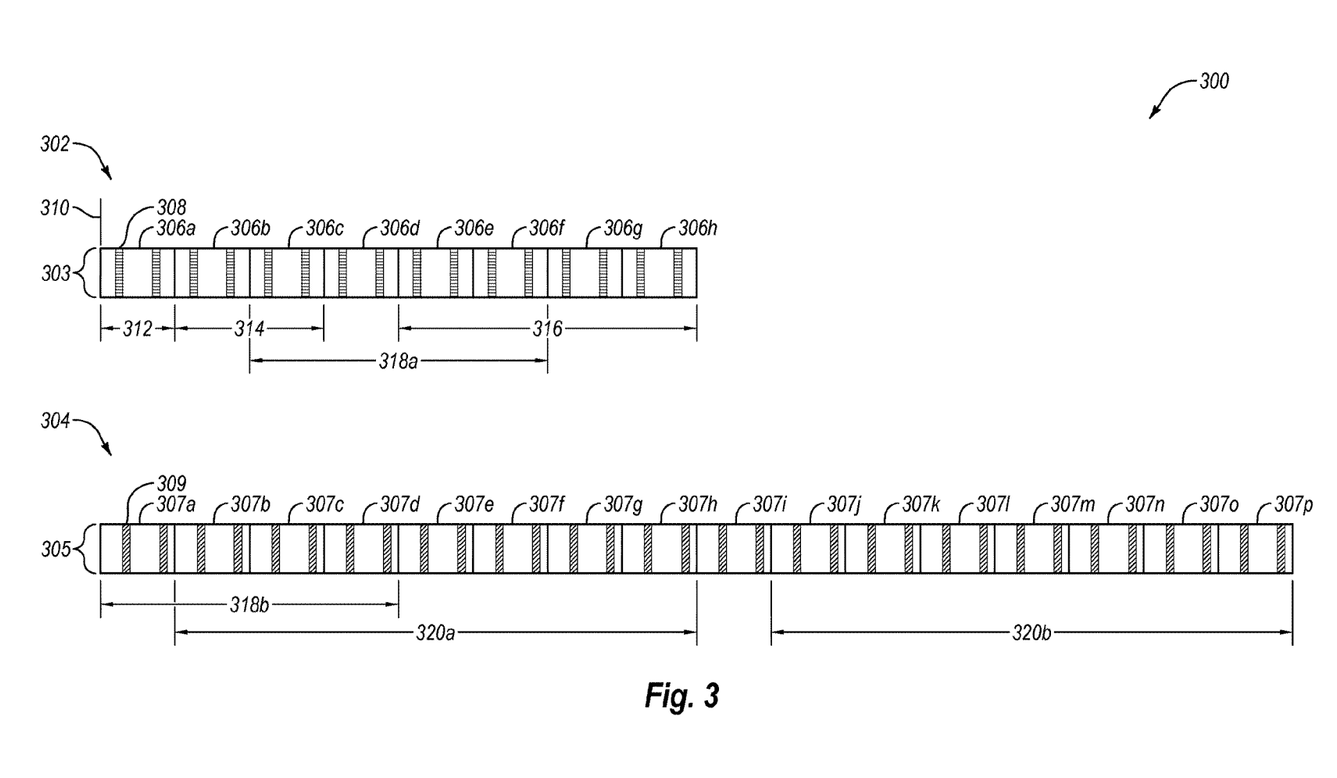
FIG. 3 is a diagram of an example coverage deficit signaling scheme that may be implemented in the telecommunication system of FIG. 1.

FIG. 3 is a diagram of an example coverage deficit signaling scheme 300 that may be implemented in the telecommunication system of FIG. 1. For example, the signaling scheme 300 may be employed for coverage deficit signaling between the terminals 104 and the base station 102 of FIG. 1.

The signaling scheme 300 may include MTC PRACH resources 302. The MTC PRACH resources 302 may cover a frequency width 303 of six PRBs transmitted across one or more subframes. In some embodiments the physical allocation of the six PRBs may be non-contiguous. In some embodiments, the frequency width 303 of the MTC PRACH resources 302 may cover an integer multiple of six PRBs. The MTC PRACH resources 302 may be transmitted across frames 306a through 306h (collectively "frames 306"). Each of the frames 306 may be 10 milliseconds (ms) in length. In some instances, the frames 306 may include frequency-division duplex (FDD) frames associated with LTE radio access networks.

In some embodiments, the signaling scheme 300 may employ the frame 306a through the frame 306h of the MTC PRACH resources 302. Although only eight frames 306 are shown, the signaling scheme 300 may be repeated on the MTC PRACH resources 302 every eight frames. Alternately or additionally, a different number of frames 306 may be used.

In these and other embodiments, the signaling scheme may include main PRACH resources 304. The main PRACH resources 304 may cover a frequency width 305 of six PRBs. In some embodiments the physical allocation of the six PRBs may be non-contiguous. Alternately, the frequency width 305 of the main PRACH resources 304 may cover an integer multiple of six PRBs. The main PRACH resources 304 may be distributed across frames 307a through 307h (collectively "frames 307"). Each of the frames may be 10 ms in length. In some instances, the frames 307 may include FDD frames associated with LTE radio access networks.

In some embodiments, the signaling scheme 300 may employ the frame 307a through the frame 307h of the main PRACH resources 304. Although only 16 frames 307 are shown, the signaling scheme 300 may be continuously repeated on the main PRACH resources 304 with a period of 16 frames 307. Alternately or additionally, a different number of frames 307 may be used. The frames 306 and the frames 307 may generally be aligned in time.

The PRACH signatures employed by the signaling scheme 300 may be transmitted in up to ten subframes across one frame. In some embodiments, using a lighter PRACH UL load may employ two PRACH subframes per frame. Each subframe may be one ms in length. In some embodiments, each of the frames 306 and each of the frames 307 may be divided into subframes 0 through 9 associated with LTE radio access networks.

The signaling scheme 300 may include primary MTC PRACH resources transmitted across a pattern of MTC PRACH resource subframes 308. In some embodiments, a coverage deficit signaling scheme for some lower deficit ranges may employ a PRACH repetition sequence distributed across a pattern of the frames 306 and may include two MTC PRACH resource subframes 308 per each of the frames 306, in accordance with a certain frequency domain multiplexing, time domain multiplexing, and/or CDM scheme. Alternately, more or fewer than two MTC PRACH resource subframes 308 may be included in one or more of the frames 306. In some embodiments, the MTC PRACH resource subframes 308 may be located within the frames 306 at a subframe #2 and a subframe #7 associated with LTE radio access networks. Alternately or additionally, the MTC PRACH resource subframes 308 may be located at different subframes of the frames 306.

The signaling scheme 300 may further include one or more PRACH resource subframes 309, which may include one or more PRACH signatures allocated for coverage deficit signaling (previously termed as the primary MTC PRACH resources). The PRACH resource subframes 309 may be located on the main PRACH resources 304. Each of the frames 307 may include up to ten PRACH resource subframes. In some embodiments used to optimize user-data-related UL spectral efficiency may include two main PRACH resource subframes 309. Alternately, more or fewer than two main PRACH resource subframes 309 may be included in one or more of the frames 307. In some embodiments, the main PRACH resource subframes 309 may be located within the frames 307 at a subframe #3 and a subframe #8 associated with LTE radio access networks. Alternately or additionally, the main PRACH resource subframes 309 may be located at different subframes of the frames 307. In some embodiments, the main PRACH resource subframes 309 may be located at different resource subframes relative to the MTC PRACH resource subframes 308.

The MTC PRACH resource subframes 308 and the main PRACH resource subframes 309 may be used for coverage deficit signaling by terminals subject to coverage deficits. For example, the MTC PRACH resource subframes 308 and the main PRACH resource subframes 309 may be used for coverage deficit signaling by the terminals 104 of FIG. 1.

A pattern of the MTC PRACH resource subframes 308 and/or the main PRACH resource subframes 309 may be used for coverage deficit signaling by terminals subject to coverage deficits. By way of example, a terminal experiencing a coverage deficit may transmit coverage deficit signaling according to a coverage deficit range signaling pattern indicating that the terminal is experiencing a coverage deficit within a coverage deficit range.

Different patterns of the MTC PRACH resource subframes 308 and/or the main PRACH resource subframes 309 may be used for coverage deficit range signaling patterns associated with different coverage deficit ranges. In some embodiments, coverage deficit range signaling patterns associated with relatively deeper coverage deficit ranges may employ relatively higher numbers of the MTC PRACH repetitions distributed across the MTC PRACH resource subframes 308 and/or the main PRACH resource subframes 309.

In some embodiments, relatively lower coverage deficit ranges may be associated with repetition patterns of the MTC PRACH resource subframes 308. Relatively deeper coverage deficit ranges may be associated with repetition patterns of the MTC PRACH resource subframes 308 and main PRACH resource subframes 309. Alternately or additionally, relatively larger coverage deficit ranges may be associated with repetition patterns of the main PRACH resource subframes 309.

The different coverage deficit range signaling patterns associated with the different coverage deficit ranges may be pre-defined and known by base stations and terminals generally corresponding, respectively, to the base station 102 and the terminals 104 of FIG. 1. The coverage deficit range signaling patterns may be synchronized by a timing reference signal 310. A SFN carried over by a PBCH associated with LTE radio access networks may be used as the timing reference signal 310. For example, coverage deficit range signaling patterns may be structured around a PBCH SFN mod 4 synchronization, a PBCH SFN mod 8 synchronization, and/or a PBCH SFN mod 16 synchronization associated with LTE radio access networks.

In some embodiments, one PRACH signature transmitted repetitively across the MTC PRACH resources 302 may be reserved for the coverage deficit signaling across the MTC PRACH resource subframes 308. Alternately or additionally, a PRACH signature transmitted repetitively associated with the main PRACH resources 304 may be reserved for the coverage deficit signaling including the main PRACH resource subframes 309. Coverage deficit signaling over the main PRACH resource subframes 309 may include coverage deficit range signaling pattern detection employing one reserved PRACH signature.

Coverage deficit signaling may be transmitted by terminals experiencing coverage deficits. In some embodiments, the coverage deficit signaling may contain a signature reserved for coverage deficit signaling. The coverage deficit signaling may be transmitted according to a coverage deficit range signaling pattern, employing a time domain multiplexing and CDM pattern, corresponding to a coverage deficit range containing the coverage deficit experienced by the terminals. For deep coverage deficit ranges, a frequency multiplexing method may be added employing both the MTC PRACH resources 302 and the main PRACH resources 304.

By way of example, the signaling scheme 300 may include a first coverage deficit range signaling pattern 312, employing one reserved PRACH signature across the MTC PRACH resource subframes 308 of the frame 306a of the MTC PRACH resources 302. The first coverage deficit range signaling pattern 312 may be associated with a first coverage deficit range. In some embodiments, the first coverage deficit range may cover a coverage deficit range of less than 0 dB and more than or equal to −3 dB.

The signaling scheme 300 may include a second coverage deficit range signaling pattern 314 including the MTC PRACH resource subframes 308 of the frame 306b and the frame 306c of the MTC PRACH resources 302. The second coverage deficit range signaling pattern 314 may be associated with a second coverage deficit range. In some embodiments, the second coverage deficit range may cover a coverage deficit range of less than −3 dB and more than or equal to −6 dB.

The signaling scheme 300 may include a third coverage deficit range signaling pattern 316 including the MTC PRACH resource subframes 308 of the frame 306e, the frame 306f, the frame 306g, and the frame 306h of the MTC PRACH resources 302. The third coverage deficit range signaling pattern 316 may be associated with a third coverage deficit range. In some embodiments, the third coverage deficit range may cover a coverage deficit range of less than −6 dB and more than or equal to −9 dB.

In some embodiments, the first coverage deficit range signaling pattern 312, the second coverage deficit range signaling pattern 314, and the third coverage deficit range signaling pattern 316 may employ time-domain repetition patterns and CDM via a PRACH signature reserved for coverage deficit signaling on the MTC PRACH resources 302.

The signaling scheme 300 may include a reserved PRACH signature across an MTC PRACH resource portion 318a of a fourth coverage deficit range signaling pattern and a reserved PRACH signature across a main PRACH resource portion 318b of the fourth coverage deficit range signaling pattern (collectively "fourth coverage deficit range signaling pattern 318"). The MTC PRACH resource portion 318a of the fourth coverage deficit range signaling pattern 318 may include the MTC PRACH resource subframes 308 of a consecutive frame sequence including the frames 306c, 306d, 306e, and 306f of the MTC PRACH resources 302. The main PRACH resource portion 318b of the fourth coverage deficit range signaling pattern 318 may include one reserved PRACH signature across the main PRACH resource subframes 309 of a consecutive frame sequence including the frames 307a, 307b, 307c, and 307d of the main PRACH resources 304. The fourth coverage deficit range signaling pattern 318 may be associated with a fourth coverage deficit range. In some embodiments, the fourth coverage deficit range may cover a coverage deficit range of less than −9 dB and more than or equal to −12 dB.

In some embodiments, the fourth coverage deficit range signaling pattern 318 may employ time-domain and frequency-domain PRACH signature repetition patterns on the MTC PRACH resource 302 and the main PRACH resources 304. For example, the fourth coverage deficit range signaling pattern 318 may employ a time-domain repetition pattern employing a PRACH signature reserved for coverage deficit signaling on the MTC PRACH resources 302 and a time-domain repetition pattern via a reserved PRACH signature on the main PRACH resources 304. The MTC PRACH resource portion 318a of the fourth coverage deficit range signaling pattern 318 and the main PRACH resource portion 318b of the fourth coverage deficit range signaling pattern 318 may employ a combined time, frequency and code-domain repetition pattern relative to one another.

The signaling scheme 300 may include a first section 320a of a fifth coverage deficit range signaling pattern and a second section 320b of the fifth coverage deficit range signaling pattern (collectively "fifth coverage deficit range signaling pattern 320"). The first section 320a of the fifth coverage deficit range signaling pattern 320 may include one reserved PRACH signature across the main PRACH resources 304 of a consecutive frame sequence including the frames 307b, 307c, 307d, 307e, 307f, 307g, and 307h of the main PRACH resources 304. The second section 320b of the fifth coverage deficit range signaling pattern 320 may include the same PRACH signature employed by the first section 320a across the main PRACH resources 304 of a consecutive frame sequence including frames 307j, 307k, 307l, 307m, 307n, 307o, and 307p of the main PRACH resources 304. The fifth coverage deficit range signaling pattern 320 may be associated with a fifth coverage deficit range. In some embodiments, the fifth coverage deficit range may cover a coverage deficit range of less than −12 dB and more than or equal to −15 dB.

In some instances, a terminal may have a UL transmission power limitation. In some embodiments, the fourth coverage deficit range signaling pattern 318 and the fifth coverage deficit range signaling pattern 320 may employ the MTC PRACH resource subframes 308 across the MTC PRACH resources 302 that may not be scheduled simultaneously to the main PRACH resource subframes 309 across the main PRACH resources 304, at least in part to accommodate the UL transmission limitation.

In some embodiments, the fifth coverage deficit range signaling pattern 320 may employ a time-domain repetition pattern via a reserved PRACH signature on the main PRACH resources 304.

In some embodiments, the first coverage deficit range signaling pattern 312, the second coverage deficit range signaling pattern 314, the third coverage deficit range signaling pattern 316, and the fourth coverage deficit range signaling pattern 318 may be synchronized by a PBCH SFN mod 8 synchronization associated with LTE radio access networks. Alternately or additionally, the fifth coverage deficit range signaling pattern 320 may be synchronized by a PBCH SFN mod 16 synchronization associated with LTE radio access networks.

In some embodiments, the fifth coverage deficit range signaling pattern 320 may have a periodicity different from a periodicity of the first coverage deficit range signaling pattern 312, the second coverage deficit range signaling pattern 314, the third coverage deficit range signaling pattern 316, and/or the fourth coverage deficit range signaling pattern 318. In some embodiments, the first coverage deficit range signaling pattern 312, the second coverage deficit range signaling pattern 314, the third coverage deficit range signaling pattern 316, and/or the fourth coverage deficit range signaling pattern 318 may occur twice for each occurrence of the fifth coverage deficit range signaling pattern 320.

By way of example, the first coverage deficit range signaling pattern 312, the second coverage deficit range signaling pattern 314, the third coverage deficit range signaling pattern 316, and/or the MTC PRACH resource portion 318a of the fourth coverage deficit range signaling pattern 318 may be repeated on the MTC PRACH resources 302 over eight frames (not shown) following the frame 306h. The main PRACH resource portion 318b of the fourth coverage deficit range signaling pattern 318 may be repeated on the main PRACH resources 304 over the frame 307j through the frame 307l.

In some embodiments, analogous coverage deficit range signaling patterns may be employed to signal a different number of coverage deficit ranges, different sizes of coverage deficit ranges, and/or a different total range of coverage deficit accommodation. For example, a coverage deficit signaling scheme based on three coverage deficit ranges may be used to similarly signal coverage deficit ranges from 0 to −6 dB (employing, for example, the second coverage deficit range signaling pattern 314), −6 to −12 dB (employing, for example, the fourth coverage deficit range signaling pattern 318), and −12 to −15 dB (employing, for example, the fifth coverage deficit range signaling pattern 320).

Figure 4:
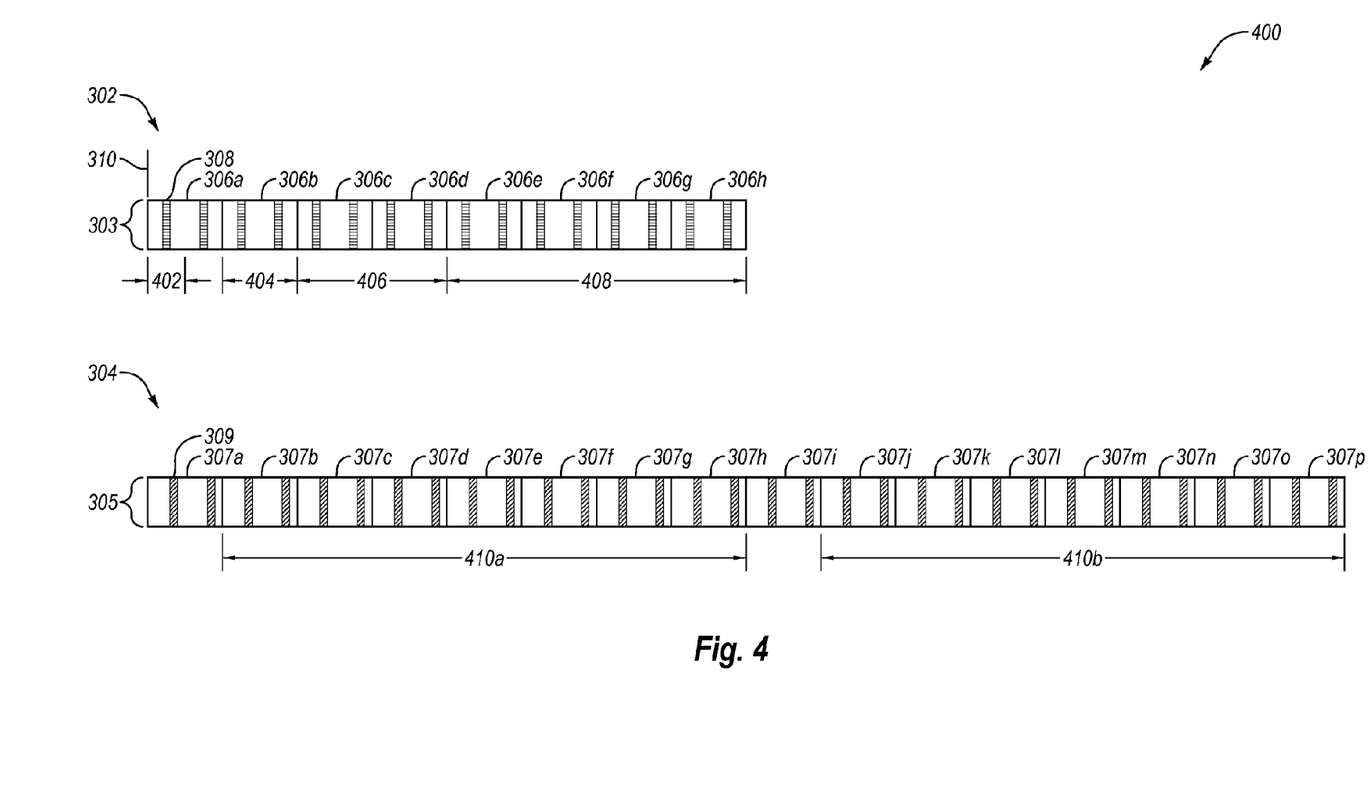
FIG. 4 is a diagram of another example coverage deficit signaling scheme that may be implemented in the telecommunication system of FIG. 1.

FIG. 4 is a diagram of another example coverage deficit signaling scheme 400 that may be implemented in the telecommunication system of FIG. 1. The signaling scheme 400 may generally correspond to the signaling scheme 300 of FIG. 3. In some embodiments, the signaling scheme 400 may be employed by terminals applying a power boost to transmissions related to the signaling scheme 400. Some embodiments of the signaling scheme 400 use a +3 dB power boost applied on all PRACH signatures employed by the signaling scheme 400. The signaling scheme 400 may be employed alternately or in addition to the signaling scheme 300 of FIG. 3.

The signaling scheme 400 includes some elements that are similar or identical to elements of the signaling scheme 300 of FIG. 3, such as the MTC PRACH resources 302, the main PRACH resources 304, the frames 306, the frames 307, the MTC PRACH resource subframes 308, the main PRACH resource subframes 309, and the timing reference signal 310, for which a more detailed description is already provided above.

By way of example, the signaling scheme 400 may include a first coverage deficit range signaling pattern 402 including a first of the MTC PRACH resource subframes 308 of the frame 306a of the MTC PRACH resources 302. The first coverage deficit range signaling pattern 402 may be associated with a first coverage deficit range. In some embodiments, the first coverage deficit range may cover a coverage deficit range of less than 0 dB and more than or equal to −3 dB.

The signaling scheme 400 may include a second coverage deficit range signaling pattern 404 including the MTC PRACH resource subframes 308 of the frame 306b of the MTC PRACH resources 302. The second coverage deficit range signaling pattern 404 may be associated with a second coverage deficit range. In some embodiments, the second coverage deficit range may cover a coverage deficit range of less than −3 dB and more than or equal to −6 dB.

The signaling scheme 400 may include a third coverage deficit range signaling pattern 406 including the MTC PRACH resource subframes 308 of the frame 306c and the frame 306d of the MTC PRACH resources 302. The third coverage deficit range signaling pattern 406 may be associated with a third coverage deficit range. In some embodiments, the third coverage deficit range may cover a coverage deficit range of less than −6 dB and more than or equal to −9 dB.

The signaling scheme 400 may include a fourth coverage deficit range signaling pattern 408 including the MTC PRACH resource subframes 308 of the frame 306e, the frame 306f, the frame 306g, and the frame 306h of the MTC PRACH resources 302. The fourth coverage deficit range signaling pattern 408 may be associated with a third coverage deficit range. In some embodiments, the third coverage deficit range may cover a coverage deficit range of less than −9 dB and more than or equal to −12 dB.

In some embodiments, the first coverage deficit range signaling pattern 402, the second coverage deficit range signaling pattern 404, the third coverage deficit range signaling pattern 406, and the fourth coverage deficit range signaling pattern 408 may employ time-domain repetition patterns via a PRACH signature reserved for coverage deficit signaling on the MTC PRACH resources 302.

The signaling scheme 400 may include a first section 410a of a fifth coverage deficit range signaling pattern and a second section 410b of a fifth coverage deficit range signaling pattern (collectively "fifth coverage deficit range signaling pattern 410"). The fifth coverage deficit range signaling pattern 410 may generally correspond to the fifth coverage deficit range signaling pattern 320 of FIG. 3. In some embodiments, the fifth coverage deficit range signaling pattern 410 may be structured around a PBCH SFN mod 8 synchronization associated with LTE radio access networks. Alternately, the fifth coverage deficit range signaling pattern 410 may be structured around a PBCH SFN mod 16 synchronization associated with LTE radio access networks.

In some embodiments, terminals experiencing a coverage deficit may apply a power boost to the transmissions associated with the signaling scheme 400. In some embodiments, one or more of the terminals may apply a +3 dB power boost. Alternately or additionally, one or more of the terminals may apply a +6 dB power boost. Alternately or additionally, one or more of the terminals may apply a different magnitude of power boost, should there be available enough UL power headroom. Applying a power boost may allow one or more of the coverage deficit range signaling patterns of the signaling scheme 400 to be relatively shorter than the corresponding coverage deficit range signaling patterns of the signaling scheme 300.

In some embodiments, terminals employing the first coverage deficit range signaling pattern 402, the second coverage deficit range signaling pattern 404, the third coverage deficit range signaling pattern 406, and/or the fourth coverage deficit range signaling pattern 408 may apply a power boost to the transmissions sent via the related signaling patterns. Alternately or additionally, terminals employing the fifth coverage deficit range signaling pattern 410 may not send the associated transmissions with a power boost.

In some instances, when the terminals apply a +3 dB power boost to the transmissions associated with the signaling scheme 400, a coverage hole signaling latency may be reduced by half compared to a non-power boosted signaling scheme.

Figure 5:
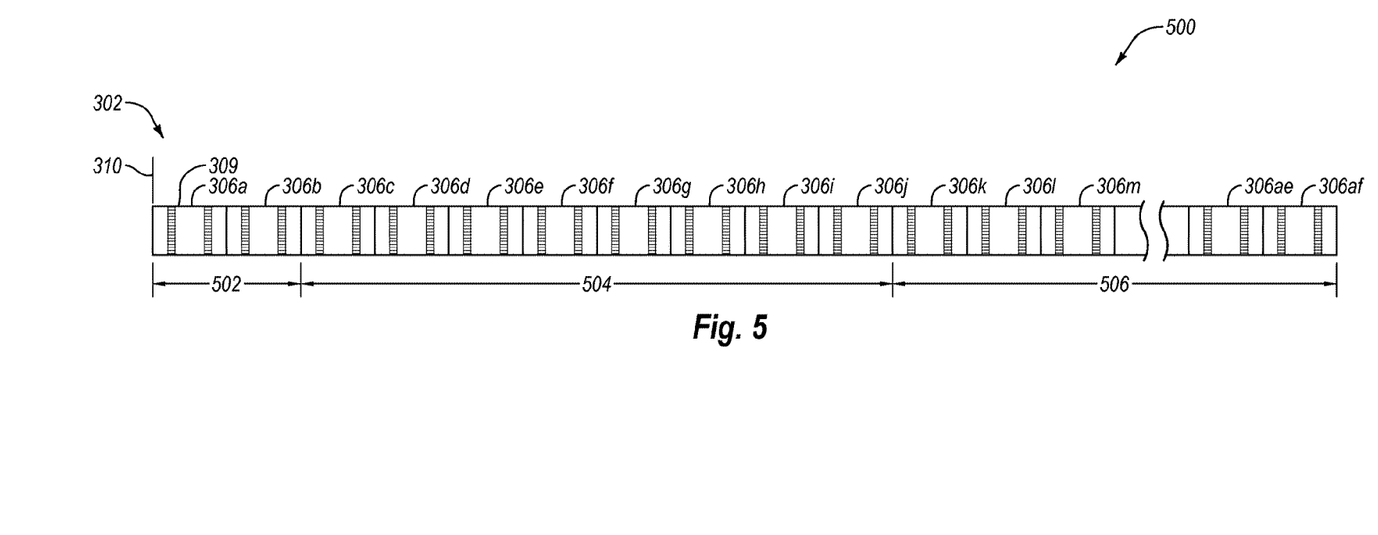
FIG. 5 is a diagram of another example coverage deficit signaling scheme that may be implemented in the telecommunication system of FIG. 1.

FIG. 5 is a diagram of another example of a coverage deficit signaling scheme 500 that may be implemented in the radio access system 100 of FIG. 1. In some embodiments, the signaling scheme 500 may be employed for coverage deficit signaling between the terminals 104 and the base station 102 of FIG. 1. The signaling scheme 500 may be employed alternately or in addition to the signaling scheme 300 of FIG. 3 and/or the signaling scheme 400 of FIG. 4.

The signaling scheme 500 includes some elements that are similar or identical to elements of the signaling scheme 300 of FIG. 3, such as the MTC PRACH resources 302, the frame 306a, the frame 306b, the frame 306c, the frame 306d, the frame 306e, the frame 306f, the frame 306g, the frame 306h, the MTC PRACH resource subframes 308, and the timing reference signal 310, for which a more detailed description is already provided above.

The signaling scheme 500 may further include a frame 306i through a frame 306af generally corresponding to the frames 306a through 306h.

The signaling scheme 500 may be continuously repeated on the MTC PRACH resources 302 every 32 frames 306 or with some other alternate or additional repetition pattern.

In some embodiments, the coverage deficit signaling transmissions may employ one reserved cyclic shift (CS) of a given PRACH ZC root associated with individual PRACH resource subframes, such as the MTC PRACH resource subframes 308 according to patterns of the signaling scheme 500. The reserved CS may be described herein as reserved PRACH signatures.

In this and other embodiments, one CS of one or two PRACH ZC roots related to a PRACH subframe signature set may be reserved to support the signaling scheme 500.

By way of example, in some instances, signaling by way of the CS may be accomplished as indicated in the following table. In some embodiments, terminals may transmit the coverage deficit signaling transmission associated with an extra coverage value correlating to the coverage deficit range.

| Signaled CS | Digital Signal | Coverage Depth |
| --- | --- | --- |
| First (i) | 01 | 0 to −6 dB |
| Second (i) | 10 | −6 to −12 dB |
| Third (i) | 11 | −12 to −15 dB (or possibly less) |

A terminal may transmit a coverage deficit signaling transmission in a corresponding pattern associated with the coverage deficit range associated with the terminal.

In some embodiments, a base station may measure a reception power of a PRACH signature across a specified time window to estimate a coarse number of terminals experiencing the respective coverage deficit ranges. The specified time window may be synchronized by the SFN mod 32.

The signaling scheme 500 may include a first coverage deficit range signaling pattern 502 including the MTC PRACH resource subframes 308 of the frame 306a and the frame 306b of the MTC PRACH resources 302. In some embodiments, the first coverage deficit range signaling pattern 502 may employ a first PRACH signature (described herein as signature i) and/or may be associated with the coverage deficit signaling transmissions having a "01" digital signal as indicated in the above table.

The first coverage deficit range signaling pattern 502 may be associated with a first coverage deficit range. In some embodiments, the first coverage deficit range may cover a coverage deficit range of less than 0 dB and more than or equal to −6 dB.

The signaling scheme 500 may include a second coverage deficit range signaling pattern 504 including the MTC PRACH resource subframes 308 of the frame 306c, through the frame 306j of the MTC PRACH resource 302. In some embodiments, the second coverage deficit range signaling pattern 504 may employ signature i and/or may be associated with the coverage deficit signaling transmissions having a "10" digital signal as indicated in the above table.

In some embodiments, the second coverage deficit range signaling pattern 504 may be associated with a second coverage deficit range. In some embodiments, the second coverage deficit range may cover a coverage deficit range of less than −6 dB and more than or equal to −12 dB.

The signaling scheme 500 may include a third coverage deficit range signaling pattern 506 including the MTC PRACH resource subframes 308 of the frame 306k through the frame 306af (22 frames) of the MTC PRACH resource 302. In some embodiments, the third coverage deficit range signaling pattern 506 may employ signature i and/or may be associated with the coverage deficit signaling transmissions having a "11" digital signal as indicated in the above table.

In some embodiments, the third coverage deficit range signaling pattern 506 may be associated with a third coverage deficit range. In some embodiments, the third coverage deficit range may cover a coverage deficit range of less than −12 dB and more than or equal to −15 dB or less.

In some embodiments, the patterns of the signaling scheme 500 may be synchronized by a PBCH SFN mod 32 synchronization.

Because different PRACH signatures may be reserved by signaling up to three different coverage deficit ranges and due to the particular structure of the signaling pattern employed in this embodiment, the received power of the respective PRACH CSs by a base station may provide a coarse indication of the amount of MTC terminals attempting to access the base station, positioned in one coverage deficit range, employing the respective PRACH CS. In some embodiments, a base station receiving the coverage deficit signaling transmissions according to the associated coverage deficit range signaling patterns of the signaling scheme 500 may estimate a number of terminals associated with each coverage deficit range.

Figure 6:
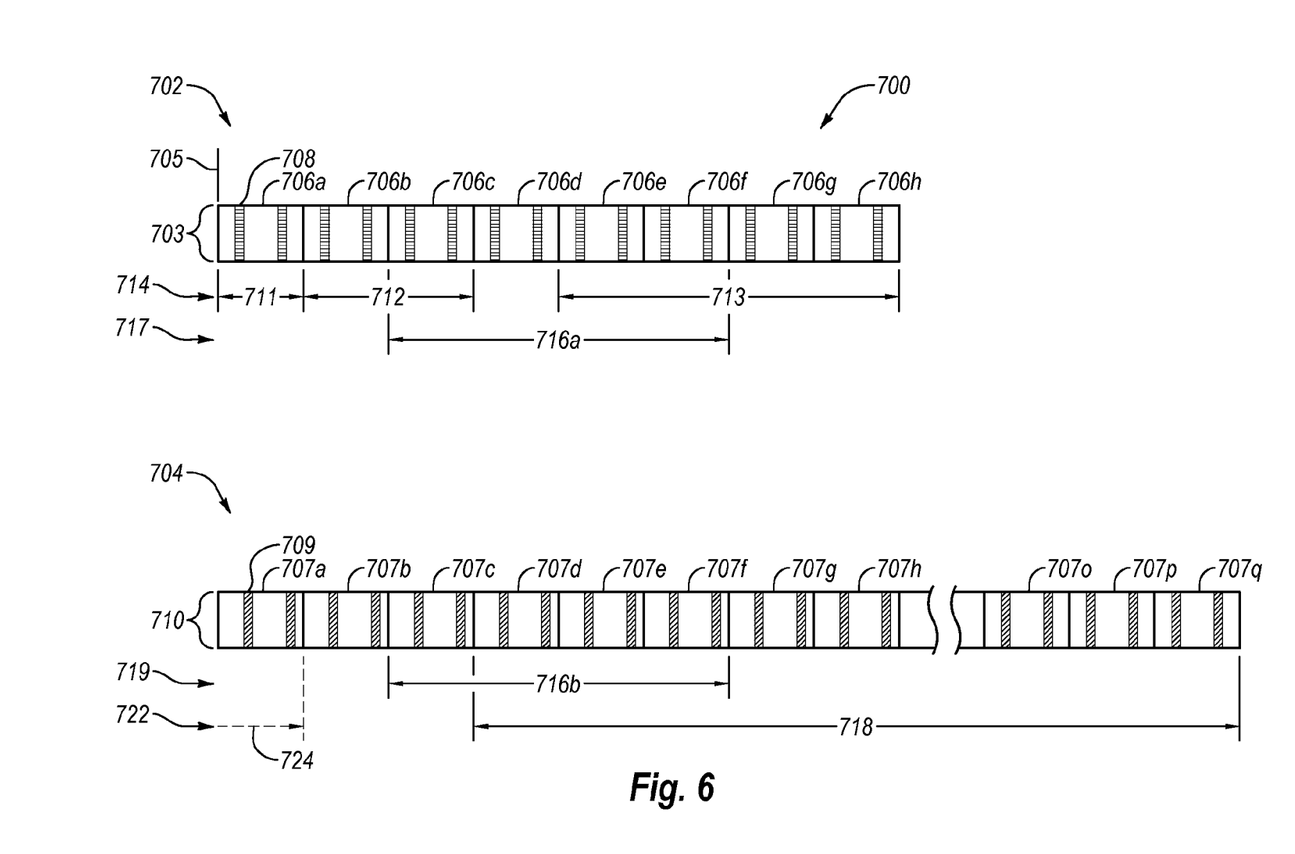
FIG. 6 is a diagram of an example random access communication scheme that may be implemented in the telecommunication system of FIG. 1.

FIG. 6 is a diagram of an example random access allocation scheme 700 that may be implemented in the radio access system 100 of FIG. 1. For example, the allocation scheme 700 may be employed for random access procedures between the base station 102 and the terminals 104, operating in a coverage deficit area, as represented by FIG. 1. The random access procedure performed by the terminals 104 in a coverage deficit area may include the terminals 104 transmitting random access sequences via a random access pattern associated with the coverage deficit range.

The allocation scheme 700 may include MTC PRACH resources 702. The MTC PRACH resources 702 may include a frequency width 703 of six PRBs. In some embodiments the physical allocation of the six PRBs may be non-contiguous. The MTC PRACH resources 702 may be divided into frames 706a through 706h (collectively "frames 706"). Each of the frames 706 may be 10 ms in length. In some instances, the frames 706 may include FDD frames associated with LTE radio access networks. In some embodiments, the MTC PRACH resources 702 may correspond to the MTC PRACH resources 302 of FIG. 3.

In some embodiments, the allocation scheme 700 may employ the frame 706a through the frame 706h of the MTC PRACH resources 702. Although only eight frames 706 are shown, the allocation scheme 700 may be repeated on the MTC PRACH resources 702 every eight frames. Alternately or additionally, a different number of frames 706 may be used.

Alternately or additionally, the allocation scheme 700 may include main PRACH resources 704. The main PRACH resources 704 may include a frequency width 710 of six PRBs. The main PRACH resources 704 may be divided into frames 707a through 707q (collectively "frames 707"). Each of the frames may be 10 ms in length. In some instances, the frames 707 may include FDD frames associated with LTE radio access networks. In some embodiments, the main PRACH resources 704 may correspond to the main PRACH resources 304 of FIG. 3.

In some embodiments, the allocation scheme 700 may employ the frame 707a through the frame 707q of the main PRACH resources 704. Although only 17 frames 707 are shown, in some embodiments, the allocation scheme 700 may be repeated on the main PRACH resources 704 every 16 frames. For example, the allocation scheme 700 associated with the frame 707b through the frame 707q may be repeated every 16 frames. Alternately or additionally, a different number of the frames 707 may be used. In some instances, the allocation scheme 700 may be repeated at different rates on the MTC PRACH resources 702 compared to the main PRACH resources 704. The frames 706 may generally be aligned in time to the frames 707.

The frames 706 and the frames 707 may be divided into subframes. Each subframe may be one ms in length. In some embodiments, each of the frames 706 and each of the frames 707 may be divided into subframes 0 through 9 associated with LTE radio access networks.

The allocation scheme 700 may include MTC PRACH resource subframes 708. In some instances, the MTC PRACH resource subframes 708 may be located at a subframe #2 and a subframe #7 associated with LTE radio access networks.

The allocation scheme 700 may further include main PRACH resource subframes 709. Some of MTC sequences employed for coverage deficit PRACH access may include a PRACH pattern sequence across the MTC PRACH resource subframes 708. Devices positioned in some of the deep coverage deficit areas may employ PRACH subframe patterns across the MTC PRACH resources 702 and the main PRACH resources 704. Each of the frames 706 may include two MTC PRACH resource subframes 708. In some embodiments, the main PRACH resource subframes 709 may be located at different resource subframes timing than the MTC PRACH resource subframes 708, in order to avoid exceeding the max UL transmitter power capability of an associated terminal.

The MTC PRACH resource subframes 708 and/or the main PRACH resource subframes 709 may be used for random access procedures by terminals subject to coverage deficits. For example, the MTC PRACH resource subframes 708 and/or the main PRACH resource subframes 709 may be used for random access procedures by the terminals 104 of FIG. 1.

Patterns of the MTC PRACH resource subframes 708 and/or the main PRACH resource subframes 709 ("random access patterns") may be used for random access procedures by terminals subject to coverage deficits. In some embodiments, the random access patterns may include repetition patterns associated with coverage deficit ranges, code-domain multiplexing patterns associated with coverage deficit ranges, time-domain multiplexing patterns associated with coverage deficit ranges, frequency-domain multiplexing patterns associated with coverage deficit ranges, or the like or any combination thereof.

By way of example, a terminal having a coverage deficit may transmit random access sequences including an initial PRACH request associated with LTE radio access networks employing a random access pattern associated with the coverage deficit range of the terminal. Alternately or additionally, a base station may transmit a random access response and/or a contention resolution message of a random access procedure associated with LTE radio access networks according to a random access pattern associated with the coverage deficit range of the terminal.

Different random access patterns may be used for random access procedures associated with different coverage deficit ranges. In some instances, random access patterns associated with relatively deeper coverage deficit ranges may include repetition patterns having relatively higher numbers of the MTC PRACH resource subframes 708 and/or the main PRACH resource subframes 709.

In some embodiments, relatively lower coverage deficit ranges may be associated with random access patterns employing the MTC PRACH resource subframes 708. Alternately or additionally, relatively deeper coverage deficit ranges may be associated with random access patterns employing the MTC PRACH resource subframes 708 and the main PRACH resource subframes 709. Alternately or additionally, relatively deeper coverage deficit ranges may be associated with random access patterns employing the main PRACH resource subframes 709.

The different random access patterns associated with the different coverage deficit ranges may be pre-defined and known by base stations and terminals generally corresponding to the base station 102 and the terminals 104 of FIG. 1. The random access patterns may be synchronized by a timing reference signal 705. The system frame number (SFN) carried over by a physical broadcast channel (PBCH) associated with LTE radio access networks may be used as the timing reference signal 705. For example, the random access patterns may be structured around a PBCH SFN mod 8 or mod 16 synchronization associated with LTE radio access networks.

By way of example, the allocation scheme 700 may include a first random access pattern 711 employing the MTC PRACH resource subframes 708 of the frame 706a of the MTC PRACH resources 702. The first random access pattern 711 may be associated with a first coverage deficit range. In some embodiments, the first coverage deficit range may cover a coverage deficit range of less than 0 dB and more than or equal to −3 dB for an additive white Gaussian noise (AWGN) channel. In other types or propagation channels, the number of the MTC PRACH resource subframes 708 per the frames 706 may be increased to preserve the periodicity of the allocation scheme 700.

The allocation scheme 700 may include a second random access pattern 712 including the MTC PRACH resource subframes 708 of the frame 706b and the frame 706c of the MTC PRACH resources 702. The second random access pattern 712 may be associated with a second coverage deficit range. In some embodiments, the second coverage deficit range may cover a coverage deficit range of less than −3 dB and more than or equal to −6 dB for an AWGN channel. In other types or propagation channels, the number of the MTC PRACH resource subframes 708 per the frames 706 may be increased to preserve the periodicity of the allocation scheme 700. In some embodiments, the second random access pattern 712 may not overlap in time with the first random access pattern 711.

The allocation scheme 700 may include a third random access pattern 713 including the MTC PRACH resource subframes 708 of the frame 706e, the frame 706f, the frame 706g, and the frame 706h of the MTC PRACH resources 702. The third random access pattern 713 may be associated with a third coverage deficit range. In some embodiments, the third coverage deficit range may cover a coverage deficit range of less than −6 dB and more than or equal to −9 dB for an AWGN channel. In other types or propagation channels, the number of the MTC PRACH resource subframes 708 per the frames 706 may be increased to preserve the periodicity of the allocation scheme 700.

The allocation scheme 700 may include an MTC PRACH portion 716a of a fourth random access pattern and a main PRACH portion 716b of the fourth random access pattern (collectively "fourth random access pattern 716"). The MTC PRACH portion 716a of the fourth random access pattern 716 may include the MTC PRACH resource subframes 708 of the frame 706c, the frame 706d, the frame 706e, and the frame 706f of the MTC PRACH resources 702. The main PRACH portion 716b of the fourth random access pattern 716 may include the main PRACH resource subframes 709 of the frame 707c, the frame 707d, the frame 707e, and the frame 707f of the main PRACH resources 704. A terminal positioned in the fourth coverage deficit range, attempting to execute a PRACH access may simultaneously employ PRACH resource allocations across the MTC PRACH portion 716a and the main PRACH portion 716b of the of the fourth random access pattern 716. While the MTC PRACH portion 716a and the main PRACH portion 716b of the of the fourth random access pattern 716 may be scheduled over the same period of time, the MTC PRACH portion 716a and the main PRACH portion 716b of the fourth random access pattern 716 may use different subframe numbers, in order to avoid exceeding the maximum allowable UL transmission power of the terminal.

The fourth random access pattern 716 may be associated with a fourth coverage deficit range. In some embodiments, the fourth coverage deficit range may cover a coverage deficit range of less than −9 dB and more than or equal to −12 dB for an AWGN channel. In other types or propagation channels, the number of the MTC PRACH resource subframes 708 per the frames 706 and/or the number of the main PRACH resource subframes 709 per the frames 707 may be increased to preserve the periodicity of the repetition scheme.

The allocation scheme 700 may include a fifth random access pattern 718. The fifth random access pattern 718 may include the main PRACH resource subframes 709 of the frame 707d through the frame 707q of the main PRACH resources 704.

In some embodiments, the fifth random access pattern 718 may have a periodicity different from a periodicity of the first random access pattern 711, the second random access pattern 712, the third random access pattern 713, and/or the fourth random access pattern 716. In some embodiments, the first random access pattern 711, the second random access pattern 712, the third random access pattern 713, and/or the fourth random access pattern 716 may occur twice for each occurrence of the fifth random access pattern 718.

By way of example, the first random access pattern 711, the second random access pattern 712, the third random access pattern 713, and/or the MTC PRACH portion 716a of the fourth random access pattern 716 may be repeated on the MTC PRACH resources 702 over eight frames (not shown) following the frame 706h. The main PRACH portion 716b of the fourth random access pattern 716 may be repeated on the main PRACH resources 704 over the frame 707j through the frame 707l.

In some instances, the periodicity of the fifth random access pattern 718 may be such than an overlap 724 occurs with the periodicity of the first random access pattern 711, the second random access pattern 712, the third random access pattern 713, and/or the fourth random access pattern 716.

The fifth random access pattern 718 may be associated with a fifth coverage deficit range. In some embodiments, the fifth coverage deficit range may cover a coverage deficit range of less than −12 dB and more than or equal to −15 dB for an AWGN channel. In other types or propagation channels, the number of the main PRACH resource subframes 709 per frame may be increased to preserve the periodicity of the allocation scheme 700.

One or more PRACH signatures may be reserved for coverage deficit random access procedures. In some embodiments, one or more PRACH signatures may be associated with each coverage deficit range. In some embodiments, the PRACH signatures may correspond with contention-free random-access preambles associated with LTE radio access networks.

One or more of the PRACH signatures may be reused for multiple coverage deficit ranges. In some embodiments, three sets of PRACH signatures may be used, providing PRACH support to devices located in coverage deficit locations corresponding to (0 . . . −6 dB), (−6 . . . −12 dB), and (−12 . . . −15 dB or lower), referenced to the cell edge coverage levels. Alternately or additionally, one or more sets of PRACH signatures may be used on both the MTC PRACH resources 702 and the main PRACH resources 704. For example, in some embodiments, two sets of PRACH signatures may be used on both the MTC PRACH resources 702 and on the main PRACH resources 704.

In some embodiments, a relatively low number of PRACH signatures may be used by the PRACH access scheme. For example, in some instances two PRACH signatures may be used by the PRACH access scheme. A relatively high number of PRACH signatures may be left for MTC terminals without coverage deficits and/or human traffic terminals. For instance, the difference to 64 PRACH signatures per subframe may be left for MTC terminals without coverage deficits and/or human traffic terminal.

By way of example, a first set of MTC PRACH signatures 714 may be used for the first random access pattern 711, the second random access pattern 712, and the third random access pattern 713. A second set of MTC PRACH signatures 717 may be used for the MTC PRACH portion 716a of the fourth random access pattern 716.

A first set of main PRACH signatures 719 may be used for the main PRACH portion 716b of the fourth random access pattern 716. In some embodiments, the first set of main PRACH signatures 719 and the second set of MTC PRACH signatures 717 may include one or more of the same signatures. A second set of main PRACH signatures 722 may be used for the fifth random access pattern 718.

In some instances, the number of repetitions associated with a particular PRACH signature set may be based on an associated coverage deficit range. Alternately or additionally, the number of repetitions associated with a particular PRACH signature set may be variable and may be updated based on the number of terminals sharing the coverage deficit range associated with the particular PRACH signature set.

In some instances, assigning main PRACH signatures, such as the first set of main PRACH signatures 719 and the second set of main PRACH signatures 722, to only relatively large coverage deficit ranges may reduce the latency experienced by non-MTC terminals and/or regular MTC terminals employing the main PRACH resource subframes 709.

In some embodiments, two main PRACH resource subframes 709 may be allocated per the frames 707 of the main PRACH resources 704 and two MTC PRACH resource subframes 708 may be allocated per the frames 706 of the MTC PRACH resources 702. The MTC PRACH resource subframes 708 may occupy different subframe numbers than the main PRACH resource subframes 709. For this and other embodiments, an overall initial PRACH preamble stage latency may be between 10 ms, repeated every 80 ms for the first random access pattern 711 and up to 160 ms for the fifth random access pattern 718 when there is a 20% PRACH subframe occupancy per frame for the MTC PRACH resources 702 and the main PRACH resources 704. The PRACH preamble latency increases the overall RACH process latency. In some embodiments, the overall PRACH latency may be reduced by increasing the number of the MTC PRACH resource subframes 708 and the main PRACH resource subframes 709, increasing the size of the signature sets, and/or employing power boosting at the terminals.

In some embodiments, a device may stop sending coverage deficit signaling upon receiving a PRACH contention resolution message associated with LTE radio access networks. Alternately or additionally, coverage deficit signaling may be re-started upon transitioning from an IDLE mode to a CONNECTED mode for a terminal associated with LTE radio access networks.

The embodiments described herein may include the use of a special-purpose or general-purpose computer including various computer hardware or software modules, as discussed in greater detail below.

Embodiments described herein may be implemented using computer-readable media for carrying or having computer-executable instructions or data structures stored thereon. Such computer-readable media may be any available media that may be accessed by a general-purpose or special-purpose computer. By way of example, and not limitation, such computer-readable media may include non-transitory computer-readable storage media including Random Access Memory (RAM), Read-Only Memory (ROM), Electrically Erasable Programmable Read-Only Memory (EEPROM), Compact Disc Read-Only Memory (CD-ROM) or other optical disk storage, magnetic disk storage or other magnetic storage devices, flash memory devices (e.g., solid state memory devices), or any other storage medium which may be used to carry or store desired program code in the form of computer-executable instructions or data structures and which may be accessed by a general-purpose or special-purpose computer. Combinations of the above may also be included within the scope of computer-readable media.

Computer-executable instructions may include, for example, instructions and data which cause a general-purpose computer, special-purpose computer, or special-purpose processing device (e.g., one or more processors) to perform a certain function or group of functions. Although the subject matter has been described in language specific to structural features and/or methodological acts, it is to be understood that the subject matter defined in the appended claims is not necessarily limited to the specific features or acts described above. Rather, the specific features and acts described above are disclosed as example forms of implementing the claims.

As used herein, the terms "module" or "component" may refer to specific hardware implementations configured to perform the operations of the module or component and/or software objects or software routines that may be stored on and/or executed by general-purpose hardware (e.g., computer-readable media, processing devices, etc.) of the computing system. In some embodiments, the different components, modules, engines, and services described herein may be implemented as objects or processes that execute on the computing system (e.g., as separate threads). While some of the system and methods described herein are generally described as being implemented in software (stored on and/or executed by general-purpose hardware), specific hardware implementations or a combination of software and specific hardware implementations are also possible and contemplated. In this description, a "computing entity" may be any computing system as previously defined herein, or any module or combination of modulates running on a computing system.

All examples and conditional language recited herein are intended for pedagogical objects to aid the reader in understanding the invention and the concepts contributed by the inventor to furthering the art, and are to be construed as being without limitation to such specifically recited examples and conditions. Although embodiments of the present inventions have been described in detail, it should be understood that the various changes, substitutions, and alterations could be made hereto without departing from the spirit and scope of the invention.

What is claimed is:

1. A method comprising:
   detecting a synchronization signal from a base station;
   determining a synchronization detection probability based on the detection of the synchronization signal;
   estimating a coverage deficit range based on the synchronization detection probability;
   transmitting coverage deficit signaling configured to indicate the coverage deficit range estimated based on the synchronization detection probability in which a power boost is applied to transmission of the coverage deficit signaling;
   receiving and decoding a system information block (SIB) indicating a repetition signaling pattern that is selected based on the coverage deficit range and an amount of the power boost that is applied to transmission of the coverage deficit signaling; and
   transmitting an initial random access request via the repetition signaling pattern indicated by the SIB and associated with the coverage deficit range.

2. The method of claim 1, wherein the coverage deficit range is estimated relative to a minimum coverage service level.

3. The method of claim 2, wherein the coverage deficit range is based on a signal-to-interference-and-noise-ratio (SINR) defined relative to a cell edge SINR, the cell edge SINR being associated with a SINR of the minimum coverage service level.

4. The method of claim 1, wherein the synchronization detection probability is correlated to the coverage deficit range via a lookup table.

5. The method of claim 1, wherein the coverage deficit signaling is transmitted via machine-type communication (MTC) physical random access channel (PRACH) resources, the coverage deficit signaling including an MTC PRACH signature reserved for coverage deficit signaling via the MTC PRACH resources.

6. The method of claim 1, wherein the coverage deficit signaling is transmitted via main physical random access channel (PRACH) resources, the coverage deficit signaling including a main PRACH signature reserved for coverage deficit signaling via the main PRACH resources.

7. The method of claim 1, wherein:
the coverage deficit signaling includes first coverage deficit signaling transmitted via machine-type communication (MTC) physical random access channel (PRACH) resources;
the method further comprises transmitting second coverage deficit signaling via main PRACH resources;
the first coverage deficit signaling includes an MTC PRACH signature reserved for coverage deficit signaling via the MTC PRACH resources; and
the second coverage deficit signaling includes a main PRACH signature reserved for the coverage deficit signaling via the main PRACH resources.

8. The method of claim 1, wherein the coverage deficit signaling is transmitted with a coverage deficit range signaling pattern associated with the coverage deficit range, the coverage deficit range signaling pattern including a repetition pattern associated with the coverage deficit range.

9. The method of claim 8, wherein the repetition pattern is synchronized based on a timing reference signal.

10. The method of claim 8, wherein the coverage deficit range signaling pattern further includes at least one of:
a code-domain multiplexing pattern associated with the coverage deficit range,
a time-domain multiplexing pattern associated with the coverage deficit range, and
a frequency-domain multiplexing pattern associated with the coverage deficit range.

11. The method of claim 1, further comprising performing a coverage deficit random access procedure.

12. The method of claim 11, wherein the coverage deficit random access procedure includes transmitting random access sequence via a machine-type communication (MTC) physical random access channel (PRACH) and via a random access pattern associated with the coverage deficit range, the random access sequence including an MTC PRACH signature associated with the coverage deficit range, the MTC PRACH signature reserved for coverage deficit random access procedures via the MTC PRACH.

13. The method of claim 11, wherein the coverage deficit random access procedure includes transmitting random access sequences via a main physical random access channel (PRACH) and via a random access pattern associated with the coverage deficit range, the random access sequence including a main PRACH signature associated with the coverage deficit range, the main PRACH signature reserved for coverage deficit random access procedures via the main PRACH.

14. The method of claim 11, wherein the coverage deficit random access procedure includes:
transmitting first random access sequence via a machine-type communication (MTC) physical random access channel (PRACH) and via a first random access pattern associated with the coverage deficit range, the first random access sequence including an MTC PRACH signature associated with the coverage deficit range, the MTC PRACH signature reserved for coverage deficit random access procedures via the MTC PRACH, and
transmitting second random access sequence via a main PRACH and via a second random access pattern associated with the coverage deficit range, the second random access signaling including a main PRACH signature associated with the coverage deficit range, the main PRACH signature reserved for the coverage deficit random access procedures via the main PRACH.

15. A terminal including a processor and a non-transitory computer-readable medium having encoded therein programming code executable by the processor to perform operations comprising:
detecting a synchronization signal from a base station;
determining a synchronization detection probability based on the detection of the synchronization signal;
estimating a coverage deficit range based on the synchronization detection probability;
transmitting coverage deficit signaling configured to indicate the coverage deficit range estimated based on the synchronization detection probability in which a power boost is applied to transmission of the coverage deficit signaling;
receiving and decoding a system information block (SIB) indicating a repetition signaling pattern that is selected based on the coverage deficit range and an amount of the power boost that is applied to transmission of the coverage deficit signaling; and
transmitting an initial random access request via the repetition signaling pattern indicated by the SIB and associated with the coverage deficit range.

16. The terminal of claim 15, wherein the coverage deficit signaling is transmitted via machine-type communication (MTC) physical random access channel (PRACH) resources, the coverage deficit signaling including an MTC PRACH signature reserved for coverage deficit communication via the MTC PRACH resources.

17. The terminal of claim 15, wherein the coverage deficit signaling is transmitted via main physical random access channel (PRACH) resources, the coverage deficit signaling including a main PRACH signature reserved for coverage deficit communication via the main PRACH resources.

18. The terminal of claim 15, the operations further comprising performing a coverage deficit random access procedure including transmitting random access sequences via a machine-type communication (MTC) physical random access channel (PRACH) and via a random access sequence pattern associated with the coverage deficit range, the random access sequence including an MTC PRACH signature associated with the coverage deficit range, the MTC PRACH signature reserved for coverage deficit random access procedures via the MTC PRACH.

19. The terminal of claim 15, the operations further comprising performing a coverage deficit random access procedure including transmitting random access sequence via a main physical random access channel (PRACH) and via a random access sequence pattern associated with the coverage deficit range, the random access sequence including a main PRACH signature associated with the coverage deficit range, the main PRACH signature reserved for coverage deficit random access procedures via the main PRACH.

* * * * *